United States Patent
Yang

(10) Patent No.: US 11,374,394 B2
(45) Date of Patent: Jun. 28, 2022

(54) DISPLAY PANEL, OVERCURRENT PROTECTION METHOD THEREOF AND DISPLAY DEVICE

(71) Applicant: HKC CORPORATION LIMITED, Shenzhen (CN)

(72) Inventor: Jidong Yang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 103 days.

(21) Appl. No.: 17/042,135

(22) PCT Filed: Jan. 29, 2019

(86) PCT No.: PCT/CN2019/073611
§ 371 (c)(1),
(2) Date: Sep. 27, 2020

(87) PCT Pub. No.: WO2020/133631
PCT Pub. Date: Jul. 2, 2020

(65) Prior Publication Data
US 2021/0021119 A1    Jan. 21, 2021

(30) Foreign Application Priority Data
Dec. 27, 2018 (CN) .......................... 201811607037.5

(51) Int. Cl.
H02H 3/093 (2006.01)
G09G 3/36 (2006.01)
H02H 3/087 (2006.01)

(52) U.S. Cl.
CPC ............. *H02H 3/0935* (2013.01); *G09G 3/36* (2013.01); *H02H 3/087* (2013.01); *G09G 2310/08* (2013.01)

(58) Field of Classification Search
CPC . H02H 3/093-0935; H02H 3/08; H02H 3/087
See application file for complete search history.

(56) References Cited

U.S. PATENT DOCUMENTS

2011/0141776 A1   6/2011  Huang et al.
2013/0190973 A1*  7/2013  Meng .................... B60K 37/06
                                                          701/36

(Continued)

FOREIGN PATENT DOCUMENTS

| CN | 107665691 A | 2/2018 |
| CN | 107742433 A | 2/2018 |
| CN | 108233337 A | 6/2018 |

OTHER PUBLICATIONS

Lijuan Dai, the ISA written comments, Oct. 2019, CN.
Lijuan Dai, the International Search Report, Oct. 2019, CN.

*Primary Examiner* — Jared Fureman
*Assistant Examiner* — Christopher J Clark

(57) ABSTRACT

The application discloses an overcurrent protection method and a display panel, where the overcurrent protection method includes the steps of: setting at least two different detection times with respect to the level period of the drive current to enable at least two sets of corresponding overcurrent protection thresholds; detecting at least two real-time currents for at least two different detection times in one level period; comparing the real-time current value and the corresponding overcurrent protection threshold value respectively, and stopping the output of the drive current if one or more of the real-time current values exceed the corresponding overcurrent protection threshold value to enable the overcurrent protection.

20 Claims, 3 Drawing Sheets

(56) References Cited

U.S. PATENT DOCUMENTS

2014/0078629 A1* 3/2014 Cortigiani .............. H03K 17/24
                                                            361/79
2018/0041022 A1* 2/2018 Fukui .................... H02H 3/093
2018/0294635 A1* 10/2018 Kozuki ................. H02H 3/085

* cited by examiner

DISPLAY PANEL, OVERCURRENT PROTECTION METHOD THEREOF AND DISPLAY DEVICE

This application claims the priority to the Chinese Patent Application No. CN201811607037.5, filed with National Intellectual Property Administration, PRC on Dec. 27, 2018 and entitled "DISPLAY PANEL, OVERCURRENT PROTECTION METHOD THEREOF AND DISPLAY DEVICE", which is incorporated herein by reference in its entirety.

TECHNICAL FIELD

The present application relates to the field of display technologies, particularly to a display panel, a overcurrent protection method thereof and a display device.

BACKGROUND

The statements herein merely provide background information related to the present application and do not necessarily constitute the conventional art.

With the development and advancement of science and technology, Liquid Crystal Display (LCD) has become the mainstream of display products due to its thin body, low power consumption and low radiation, and has been widely used. Most of the liquid crystal displays on the market are backlight liquid crystal displays, which include liquid crystal panels and backlight modules. The working principle of liquid crystal panels is to place liquid crystal molecules in two parallel glass substrates and apply driving voltage on the two glass substrates to control the rotation direction of the liquid crystal molecules, so as to refract the light of the backlight modules to generate a picture.

Thin Film Transistor-Liquid Crystal Display (TFT-LCD) has been playing a leading role in the display field due to its low power consumption, excellent picture quality and high production yield. Also, the thin film transistor liquid crystal display includes a liquid crystal panel and a backlight module, the liquid crystal panel includes a color filter substrate (CF Substrate, also referred to as a color filter substrate), a thin film transistor substrate and a mask, and a transparent electrode is disposed on the opposite inner side of the substrate. A layer of Liquid Crystal molecules (LC) is sandwiched between the two substrates. As for the application of Gate Driver on Array (GOA) technology, in-plane short circuit will occur, which will lead to screen burning.

SUMMARY

The purpose of the present application is to provide a display panel, an overcurrent protection method thereof and a display device, so as to prevent short circuits in the display panel from causing screen burning.

To achieve the above objective, the present application provides an overcurrent protection method, including the steps of:

setting at least two different detection time windows within a level period of the drive current, wherein each time window has its own corresponding overcurrent protection threshold;

detecting at least one real-time current value during each detection time window in the level period;

comparing the real-time current values with the corresponding overcurrent protection thresholds respectively, if one or more of the real-time current values exceed the corresponding overcurrent protection thresholds, the overcurrent protection is enabled and the output of the drive current is stopped.

Optionally, the step of setting at least two different detection time windows within the level period of the drive current, wherein each time window has its own corresponding overcurrent protection threshold includes: the detection time windows include a first detection time window and a second detection time window, and the second detection time window is set after the first detection time window and before level switching; the overcurrent protection thresholds include a first overcurrent threshold and a second overcurrent threshold, and the second overcurrent threshold is smaller than the first overcurrent threshold; the first detection time window corresponds to the first overcurrent threshold, and the second detection time window corresponds to the second overcurrent threshold.

Optionally, a preset waiting time is set after a level switching time and before a first detection time; the real-time current value is not detected during the waiting time, and detection of the current value is not started until the first detection time.

Optionally, the step of detecting at least one real-time current value during each detection time window during one level period includes:

continuously sampling the drive current during the first detection time window to obtain a set of first current sampling values;

continuously sampling the drive current during the second detection time window to obtain a set of second current sampling values;

the step of comparing the real-time current values with the corresponding overcurrent protection threshold, if one or more of the real-time current values exceed the corresponding overcurrent protection thresholds, the overcurrent protection is enabled and the output of the drive current is stopped, includes:

if a first current sampling value in the first detection time window is greater than the first overcurrent threshold value, an overcurrent record is added; when the number of overcurrent records is equal to or greater than the preset number of times the overcurrent protection is enabled, the overcurrent protection is enabled and the output of the drive current is stopped;

if a second current sampling value in the second detection time window is greater than the second overcurrent threshold value, the overcurrent protection is enabled and the output of the drive current is stopped.

Optionally, the step of detecting at least one real-time current value during each detection time window during the level period includes:

continuously sampling the drive current during the first detection time window to obtain a set of first current sampling values;

sampling the drive current at at least one time point in the second detection time window to obtain a set of second current sampling values;

the step of comparing the real-time current values with the corresponding overcurrent protection threshold, if one or more of the real-time current values exceed the corresponding overcurrent protection thresholds, the overcurrent protection is enabled and the output of the drive current is stopped, includes:

if a first current sampling value in the first detection time window is greater than the first overcurrent threshold value, an overcurrent record is added; when the number of overcurrent records is equal to or greater than the preset number of times the overcurrent protection is enabled, the overcurrent protection is enabled and the output of the drive current is stopped;

if a second current sampling value in the second detection time window is greater than the second overcurrent threshold value, the overcurrent protection is enabled and the output of the drive current is stopped.

Optionally, a period of time after the first level switching and before the next level switching is called a level period; the waiting time is within the first 10% of the level period, the first detection time window is within a period of time after the end of the waiting time, and the period of time accounts for 20% of the total level period; the second detection time window is within the last 10% of the level period.

Optionally, the step of setting at least two different detection time windows within the level period of the drive current, wherein each time window has its own corresponding overcurrent protection threshold includes: the output drive current is a current generated by a clock signal voltage.

Optionally, the step of detecting at least one real-time current value during each detection time window within the level period includes: the output drive current is an analog signal, and the drive current is analog-to-digital converted during the real-time current detection to obtain a current sampling value in a digital signal format.

Optionally, the step of setting at least two different detection time windows within the level period of the drive current, wherein each time window has its own corresponding overcurrent protection threshold includes: obtaining a current waveform diagram generated by the drive current according to the drive voltage.

Optionally, before the step of setting at least two different detection time windows within the level period of the drive current to enable at least two sets of corresponding overcurrent protection thresholds, a look-up table is arranged in the drive circuit board, which stores the detection time window and the corresponding overcurrent protection threshold. The first overcurrent threshold and the second overcurrent threshold for enabling the overcurrent protection are set according to the look-up table.

Optionally, the step of comparing the real-time current values with the corresponding overcurrent protection threshold, if one or more of the real-time current values exceed the corresponding overcurrent protection thresholds, the overcurrent protection is enabled and the output of the drive current is stopped, includes:

comparing the real-time current values with the corresponding overcurrent protection threshold, if one or more of the real-time current values exceed the corresponding overcurrent protection thresholds;

controlling the drive circuit board to stop the output of the drive current, and enable the overcurrent protection.

Optionally, the drive current is a clock signal current of the gate drive circuit.

The application also discloses a display panel, which includes an overcurrent protection circuit; the overcurrent protection circuit includes an output device which sets at least two different detection time windows to enable at least two sets of corresponding overcurrent protection thresholds for the level period of the drive current; a detection circuit configured to detect at least two real-time currents for at least two different detection time windows in one level period; a judging circuit configured to compare the real-time current value and the corresponding overcurrent protection threshold value respectively, and stop the output of the drive current when one or more of the real-time current values exceed the corresponding overcurrent protection threshold values to enable the overcurrent protection.

Optionally, the display panel includes a drive circuit board; when the judging circuit enables the overcurrent protection, the driving circuit board is controlled to stop outputting the drive current.

Optionally, the drive circuit board includes a memory provided with a look-up table, and the output device obtains a first overcurrent threshold and a second overcurrent threshold according to the look-up table, and sends the obtained first overcurrent threshold and the second overcurrent threshold to the judging circuit; the judging circuit compares the real-time current value and the corresponding overcurrent protection threshold value respectively, and stops the output of the drive current to enable the overcurrent protection when one or more of the real-time current values exceed the corresponding overcurrent protection threshold values.

Optionally, the display panel includes a timing control circuit, and the detection circuit determines a detection time window based on the time circuit and detects at least two real-time currents for at least two different detection time windows respectively, within the level period.

Optionally, a preset waiting time is set after a level switching time and before a first detection time; the real-time current value is not detected during the waiting time, and detection of any real-time current value is not started until the first detection time.

Optionally, the display panel includes a digital-to-analog conversion circuit connected between a detection circuit and a judging circuit; the drive current output by the detection circuit is an analog signal, and the digital-to-analog conversion circuit performs analog-to-digital conversion on the drive current to obtain a current sampling value in a digital signal format, and sends the current sampling value to the judging circuit.

The present application also discloses a display device including the display panel described above.

In contrast to setting a detection time window and a set of overcurrent protection thresholds after each level switch, and the overcurrent protection is enabled when more than one of the real-time current values exceed the corresponding overcurrent protection threshold; in the case of a severe short circuit, for a solution in which the panel may be burned before the overcurrent protection is enabled, the present application is provided with at least two different detection time windows and at least two sets of corresponding overcurrent protection thresholds, and when one or more real-time current values exceed the corresponding overcurrent protection thresholds, the overcurrent protection is enabled and the output of the drive current is stopped; with this method, even if one of the detection time windows does not detect that the display panel is in a continuous short circuit state, the other detection time window can detect that the display panel is in a state of continuous short circuit, which can protect the display panel, avoid the display panel from working under large short circuit currents, and prevent screen burning caused by the serious short circuit, so that the protection is more accurate.

BRIEF DESCRIPTION OF DRAWINGS

The accompanying drawings, which are included to provide a further understanding of embodiments of the present application and constitute a part of the specification, illustrate embodiments of the application and, together with the text description, explain the principles of the application. Obviously, the drawings in the following description are merely some embodiments of the present application, and those skilled in the art can obtain other drawings according to the drawings without any inventive labor. In the drawings.

DETAILED DESCRIPTION OF EMBODIMENTS

The specific structural and functional details disclosed herein are merely representative and are illustrative of the exemplary embodiments of the present application. However, the present application may be embodied in many alternative forms and should not be construed as being limited only to the embodiments set forth herein.

In the description of the present application, it should be understood that, the terms "center", "horizontally", "up", "down", "left", "right", "vertical", "horizontal", "top", "bottom", "inner", "outer" and the like for indicating an orientation or positional relationship are based on the orientation or positional relationship shown in the accompanying drawings, and are intended solely to facilitate description and simplification of the description, and are not intended to indicate or imply that the device or element referred to must have a specific orientation, be constructed and operated in a specific orientation, and thus is not to be construed as limiting the present application. Further, the terms "first" and "second" are only for the purpose of description and are not to be construed as indicating or implying a relative importance or implicitly indicating the number of technical features indicated. Therefore, a feature defined as "first," and "second," may explicitly or implicitly include one or more of the features. In the description of the present application, "multiple" means two or more unless otherwise noted. In addition, the term "including" and any variations thereof are intended to cover non-exclusive inclusion.

In the description of the present application, it should be noted that, unless expressly specified and defined otherwise, the terms "mount", "attach" and "connect" are to be understood broadly, for example, it can be a fixed connection, a detachable connection, or an integral connection; it can be an either mechanical connection or an electrical connection; it can be a direct connection or an indirect connection through an intermediate medium, and can be an internal connection between two elements. For those skilled in the art, the specific meaning of the above terms in this application can be understood according to the specific circumstances.

The terms used herein are merely intended to describe specific embodiments and are not intended to limit the exemplary embodiments. Unless clearly indicated by the context otherwise, the singular forms "a" or "an" are intended to include the plural. It should also be understood that the terms "include" and/or "comprise" as used herein specify the presence of the features, integers, steps, operations, units and/or components set forth without excluding the presence or addition of one or more other features, integers, steps, operations, units, components and/or combinations thereof.

The present application will now be described in conjunction with the accompanying drawings and alternative embodiments.

Figure 1:
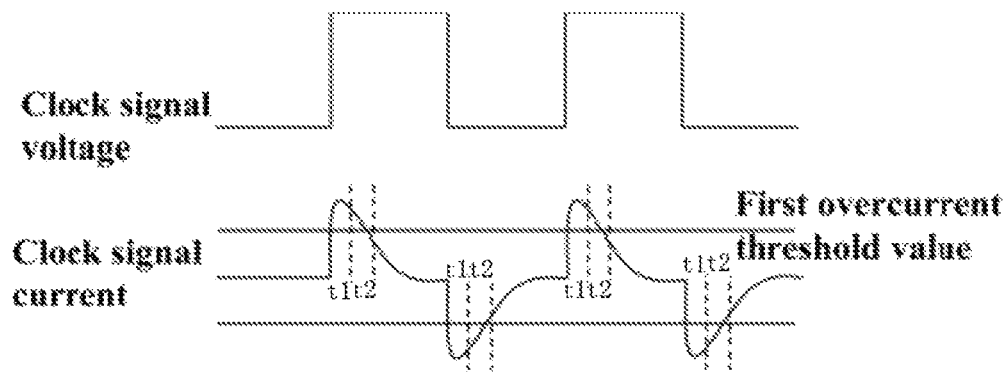
FIG. 1 is a schematic diagram of an overcurrent protection method according to one embodiment of the present application.
Figure 2:
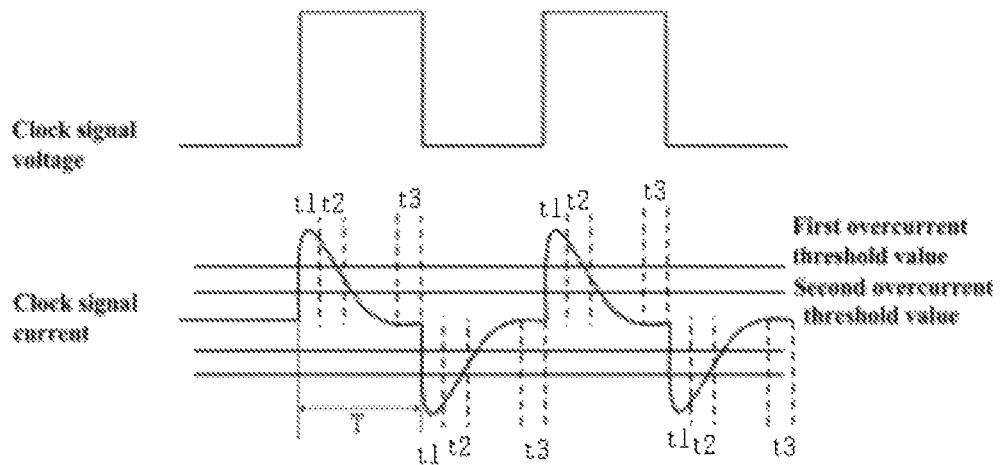
FIG. 2 is a schematic diagram of an overcurrent protection method according to one embodiment of the present application.
Figure 3:
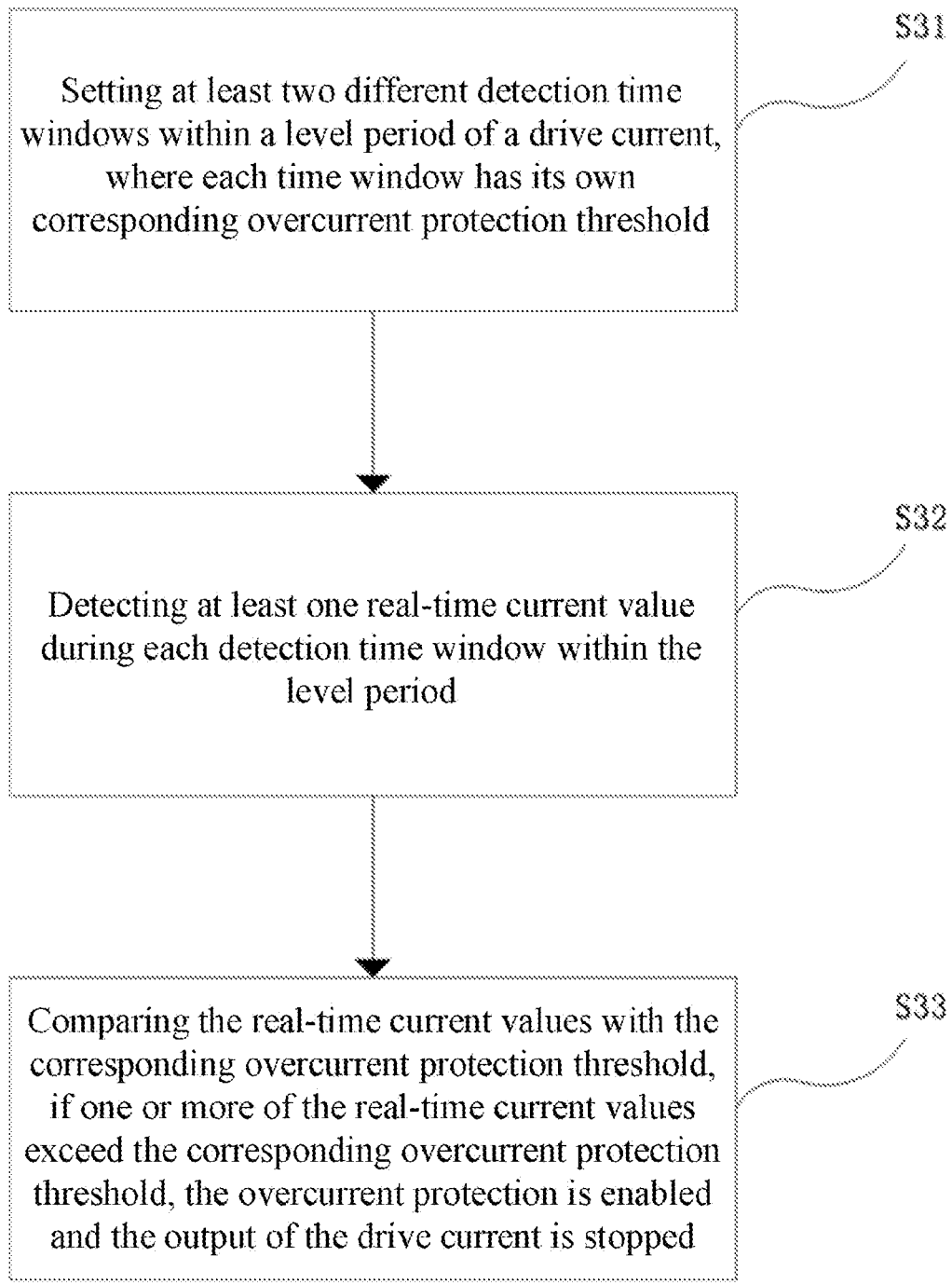
FIG. 3 is an application flow chart of an overcurrent protection method according to one embodiment of the present application.

Referring to FIGS. 1 to 3, the embodiment of the present application disclose an overcurrent protection method, including the steps of:

setting at least two different detection time windows within a level period of the drive current, wherein each time window has its own corresponding overcurrent protection threshold;

detecting at least one real-time current value during each detection time window in the level period;

comparing the real-time current values with the corresponding overcurrent protection thresholds respectively, if one or more of the real-time current values exceed the corresponding overcurrent protection thresholds, the overcurrent protection is enabled and the output of the drive current is stopped.

The overcurrent protection method may be an overcurrent protection method of a display panel. The drive current is the drive current for driving the display panel. As another embodiment of the present application, referring to FIGS. 1, 2 and 4, it discloses a display panel including an overcurrent protection circuit 300, the overcurrent protection circuit including: an output device 110 configured to set at least two different detection time windows, wherein each time window has its own corresponding overcurrent protection threshold for a level period of the drive current; a detection circuit 120 configured to detect at least two real-time currents respectively for at least two different detection time windows within the level period; a judging circuit 130 configured to compare the real-time current value with the corresponding overcurrent protection threshold, if one or more of the real-time current values exceed the corresponding overcurrent protection threshold, stop the output of the drive current to enable the overcurrent protection.

In contrast to setting a detection time window and a set of overcurrent protection thresholds after each level switch, and the overcurrent protection is enabled when more than one of the real-time current values exceed the corresponding overcurrent protection threshold; in the case of a severe short circuit, for a solution in which the panel may be burned before the overcurrent protection is enabled, the present application is provided with at least two different detection time windows and at least two sets of corresponding overcurrent protection thresholds, and when one or more real-time current values exceed the corresponding overcurrent protection thresholds, the overcurrent protection is enabled and the output of the drive current is stopped; with this method, even if one of the detection time windows does not detect that the display panel is in a continuous short circuit state, the other detection time window can detect that the display panel is in a state of continuous short circuit, which can protect the display panel, effectively avoid the display panel from continuously working under large short circuit currents, and prevent screen burning caused by the serious short circuit, so that the protection is more accurate. As shown in FIG. 2, the level period (T) of this solution refers to the period after each level switch and before the next level switch. The overcurrent protection thresholds can be two different sets of thresholds, corresponding to two different current intensities respectively.

Figure 4:
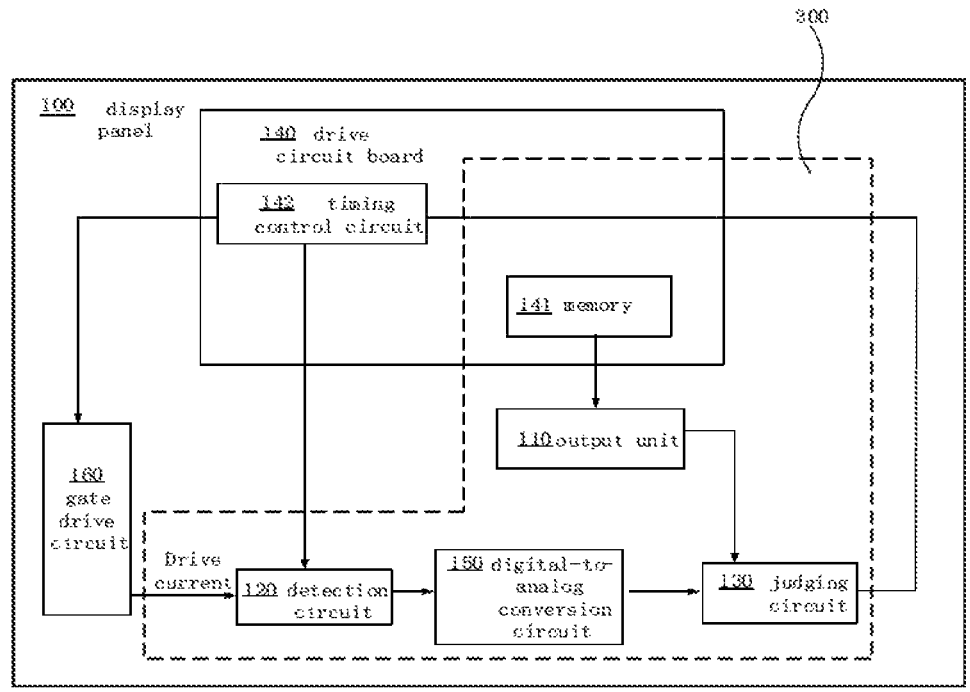
FIG. 4 is a schematic diagram of a display panel of one embodiment of the present application.
Figure 5:
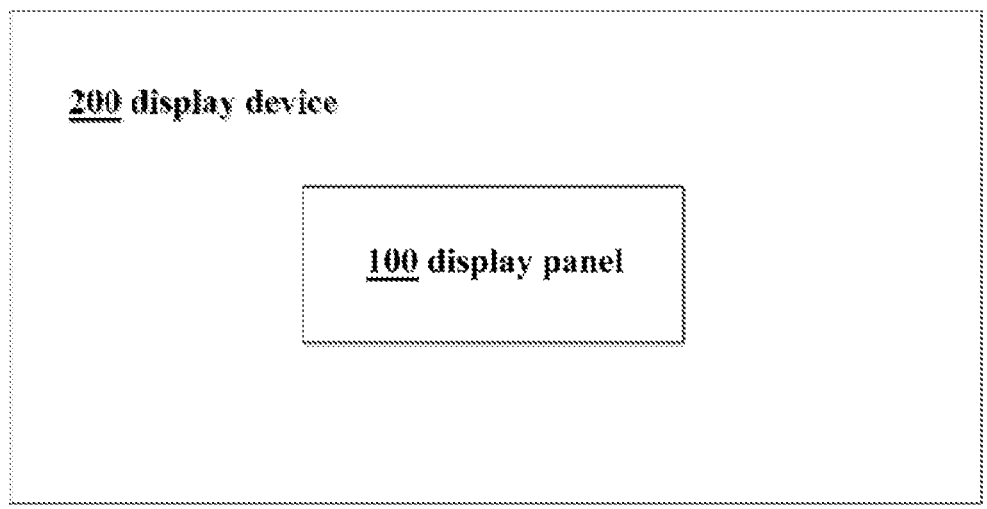
FIG. 5 is a schematic diagram of a display device of one embodiment of the present application.

Specifically, as shown in FIG. 4, the display panel includes a drive circuit board 140 and a timing control circuit 142. When the judging circuit 130 enables the overcurrent protection, the drive circuit board 140 is controlled to stop outputting the drive current; the detection circuit 120 determines a detection time window according to the timing control circuit 142, and detects at least two real-time currents for at least two different detection time windows respectively within the level period.

In one or more embodiments, the step of setting at least two different detection time windows within a level period of a drive current, wherein each time window has its own corresponding overcurrent protection threshold includes: the detection time windows include a first detection (t2) time and a second detection time window (t3), and the second detection time window (t3) is set after the first detection time window (t2) and before level switching; the overcurrent protection thresholds include a first overcurrent threshold and a second overcurrent threshold, and the second overcurrent threshold is less than the first overcurrent threshold; the first detection time window (t2) corresponds to the first overcurrent threshold, and the second detection time window (t3) corresponds to the second overcurrent threshold.

In this solution, two different detection time windows and two different sets of overcurrent protection thresholds are used; comparing the implemented current value detected at the first detection time window (t2) with the first overcurrent threshold, and comparing the implemented current value detected at the second detection time window (t3) with the second overcurrent threshold; a second detection time window (t3) is after the first detection time window (t2) and before the level switching, and the normal real-time current value corresponding to the second detection time window is minimum; if the current value increases suddenly during this time, a short circuit will occur; if a second overcurrent threshold smaller than the first overcurrent threshold is set, the overcurrent protection can be enabled during the short circuit to prevent the display panel from being burned. As shown in FIG. 2, the first detection time window and the second detection time window are within the level period, the second detection time window is after the first detection time window and before the level switch; corresponding to one level period of the clock signal current, the magnitude of the current is different for the two detection time windows, therefore two different overcurrent protection thresholds need to be set correspondingly. In this solution, the overcurrent protection threshold corresponding to the second detection time window is smaller than the overcurrent protection threshold corresponding to the first detection time window, so as to avoid the problem that the real-time current actually exceeds the normal condition in the second detection time window, but the overcurrent protection is not enabled due to high overcurrent protection threshold.

In one or more embodiments, the reference voltages corresponding to the first overcurrent threshold and the second overcurrent threshold are different. In this solution, the first overcurrent threshold and the second overcurrent threshold are different because they correspond to different reference voltages, and the real-time current values corresponding to the overcurrent protection to be enabled are different.

In one or more embodiments, a preset waiting time is set after a level switching time and before a first detection time; the real-time current value is not detected during the waiting time, and detection of the current value is not started until the first detection time window. In this solution, a large inrush current may be generated at the instant of level switching, which leads to misjudgment of detection mechanism. Therefore, no detection is performed in the waiting time (t1), but detection is performed after the waiting time (t1).

In one or more embodiments, the step of detecting at least one real-time current value during each detection time window within the level period includes:
continuously sampling the drive current during the first detection time window (t2) to obtain a set of first current sampling values;
continuously sampling the drive current during the second detection time window (t3) to obtain a set of second current sampling values;
the step of comparing the real-time current values with the corresponding overcurrent protection threshold, if one or more of the real-time current values exceed the corresponding overcurrent protection threshold, the overcurrent protection is enabled and the output of the drive current is stopped, includes:
if a first current sampling value in the first detection time window (t2) is greater than the first overcurrent threshold value, an overcurrent record is added; when the number of overcurrent records is equal to or greater than the preset number of times the overcurrent protection is enabled, the overcurrent protection is enabled and the output of the drive current is stopped;
if a second current sampling value in the second detection time window (t3) is greater than the second overcurrent threshold value, the overcurrent protection is enabled and the output of the drive current is stopped.

In this solution, two different methods are used to simultaneously detect real-time current values to determine whether to enable overcurrent protection. By combining the two detection methods, the current value of the display panel can be closely detected. Once a short circuit occurs, the overcurrent protection is enabled to avoid the display panel from working under the large short-circuit current, prevent the display panel from being burned by the large current in the serious short circuit, and increase the accuracy of the protection. At that same time, in the first detection time window (t2) and the second detection time window (t3), the method of continuously sampling the current of the drive current eliminates the overcurrent protection of the instantaneous large current that does not need to enable the overcurrent protection and reduce the probability of false triggering of the overcurrent protection, so that the overcurrent protection system of the display panel can carry out the current detection safely and efficiently while carrying out the overcurrent protection on the display panel.

In one or more embodiments, the step of detecting at least one real-time current value during each detection time window within the level period includes:
continuously sampling the drive current during the first detection time window (t2) to obtain a set of first current sampling values;
sampling the drive current at one time point in the second detection time window (t3) to obtain a set of second current sampling values;
the step of comparing the real-time current values with the corresponding overcurrent protection threshold, if one or more of the real-time current values exceed the corresponding overcurrent protection threshold, the overcurrent protection is enabled and the output of the drive current is stopped, includes:
if a first current sampling value in the first detection time window (t2) is greater than the first overcurrent threshold value, an overcurrent record is added; when the number of overcurrent records is equal to or greater than the preset number of times the overcurrent protection is enabled, and the overcurrent protection is enabled and the output of the drive current is stopped;

if the second current sampling instantaneous value in any one of the second detection time window (t3) is greater than the second overcurrent threshold value, the overcurrent protection is enabled and the output of the drive current is stopped.

In this solution, two different methods are used to simultaneously detect real-time current values to determine whether to enable overcurrent protection. By combining the two detection methods, the current value of the display panel can be closely detected. Once a short circuit occurs, the overcurrent protection is enabled to avoid the display panel from continuously working under the large short-circuit current, prevent the display panel from being burned by the large current in the serious short circuit, and increase the accuracy of the protection. At the same time, at one time point in the second detection time window (t3), the way in which the drive current is sampled can accurately monitor the instantaneous change of real-time current. Once the instantaneous large current occurs at this time, the overcurrent protection is enabled, the processing pressure of the overcurrent protection detection system is reduced, and the power consumption of the overcurrent protection detection system is reduced, so that the service life of the overcurrent protection system and the display panel is extended while the display panel is under overcurrent protection. In addition, the preset number of times to enable the overcurrent protection in this solution is to measure or simulate the different types of panels according to the design structure of the display panel and the detection frequency, so as to confirm the time to be resistant to high current when the panels are short-circuited, and to determine the number of times to enable the overcurrent protection according to the detection frequency.

In one or more embodiments, the step of detecting at least one real-time current value during each detection time window within the level period includes:

continuously sampling the drive current during the first detection time window (t2) to obtain a set of first current sampling values;

sampling the drive current at multiple time points in the second detection time window (t3) to obtain a set of second current sampling values;

the step of comparing the real-time current values with the corresponding overcurrent protection threshold, if one or more of the real-time current values exceed the corresponding overcurrent protection threshold, the overcurrent protection is enabled and the output of the drive current is stopped, includes:

if a first current sampling value in the first detection time window (t2) is greater than the first overcurrent threshold value, an overcurrent record is added; when the number of overcurrent records is equal to or greater than the preset number of times the overcurrent protection is enabled, the overcurrent protection is enabled and the output of the drive current is stopped;

if a second current sampling value in the second detection time window (t3) is greater than the second overcurrent threshold value, the overcurrent protection is enabled and the output of the drive current is stopped.

In this solution, two different methods are used to simultaneously detect real-time current values to determine whether to enable overcurrent protection. By combining the two detection methods, the current value of the display panel can be closely detected. Once a short circuit occurs, the overcurrent protection is enabled to avoid the display panel from continuously working under the large short-circuit current, prevent the display panel from being burned by the large current in the serious short circuit, and increase the accuracy of the protection. At the same time, in the second detection time window (t3), the way in which the drive current is sampled through multiple time points can accurately monitor the instantaneous change of real-time current reduces the processing pressure of the overcurrent protection detection system and reduces the power consumption of the overcurrent protection detection system, so that the service life of the overcurrent protection system and the display panel is extended while the display panel is under overcurrent protection.

In one or more embodiments, the period after the first level switching and before the next level switching is a level period; the waiting time is within the first 10% of the level period, the first detection time window (t2) is within a period after the end of the waiting time (t1), and the period accounts for 20% of the total level period; the second detection time window (t3) is within the last 10% of the level period.

Generally, for the level period of the clock signal, the current is large at the beginning of the level period and the current at the end of the level period is small. In this solution, the second detection time window is 10% of the time after the level period, corresponding to the time when the normal real-time current is minimum.

In this solution, after the level switching, the current value is large, so the current value is not detected at this time, and the waiting time is within the first 10% of the level period, that is, the current value is not detected during the first 10% of the level period; the waiting time, the first detection time window and the second detection time window can be set at different time points or time periods in the level period as needed, and need not be cooperated together, and can be adjusted according to the actual situation; and there is a time interval between the first detection time window (t2) and the second detection time window (t3).

In one or more embodiments, the step of setting at least two different detection time windows within the level period of the drive current, wherein each time window has its own corresponding overcurrent protection threshold includes: the output drive current is a current generated by a clock signal voltage.

In this solution, as the clock signal voltage is square wave voltage and has a fixed period and a fixed clock frequency, so the current of the display panel presents a stable change in normal operation; and the clock signal voltage has only two levels, namely a high level and a low level; the high level of the clock signal voltage can be changed according to the circuit driving the display panel, and can be applied to a plurality of types of display panels; the durations of the high level and the low level of the clock signal voltage are the same, thus when the corresponding drive current is generated through clock signals, the change durations of the corresponding drive currents are the same, which facilitates setting the first detection time window (t2) and the second detection time window (t3) after each level switch, realizes the same interval between the first detection time window (t2) and between the second detection time window (t3), and can effectively protect the display panel from overcurrent, so as to avoid the burnout of the display panel when the current is too large. Specifically, the display panel includes a gate drive circuit; the drive current is a clock signal current of the gate drive circuit 160.

In one or more embodiments, the step of detecting at least one real-time current value during each detection time window within the level period includes: the output drive current is an analog signal, and the drive current is analog-to-digital converted during real-time current detection to obtain a current sampling value in a digital signal format.

In this solution, because of the digital-to-analog conversion of the drive current, the real-time data statistics of the change of the drive current can be carried out while the real-time current detection is carried out on the display panel, so as to facilitate the analysis of the drive current of the display panel and the short-circuit current when the current is short-circuited, thereby facilitating the determination of the applicability of the overcurrent protection method. Specifically, the display panel 100 includes a digital-to-analog conversion circuit 150 connected between a detection circuit 120 and a judging circuit 130; the drive current output by the detection circuit 120 is an analog signal, and the digital-to-analog conversion circuit 160 performs analog-to-digital conversion on the drive current to obtain a current sampling value in a digital signal format, and sends the current sampling value to the judging circuit 130.

In one or more embodiments, the step of setting at least two different detection time windows within the level period of the drive current, wherein each time window has its own corresponding overcurrent protection threshold includes: obtaining a current waveform diagram generated by the drive current according to the drive voltage.

In this solution, a current waveform diagram generated by the drive current is obtained according to the drive voltage, the drive voltage suitable for different display panels is selected, and the corresponding current waveform diagram is obtained according to the voltage change waveform diagram of the drive voltage, which is helpful to set the first detection time window and the second detection time window (t3) according to the waveform diagram, so that the overcurrent protection function of the display panel can operate more effectively. The detection time window can be set at a suitable position, to make detection time window more accurate and avoid burning of the display panel during the operation under a large current.

In one or more embodiments, before the step of setting at least two different detection time windows within the level period of the drive current, wherein each time window has its own corresponding overcurrent protection threshold, a look-up table is arranged in the drive circuit board, which stores the detection time window and the corresponding overcurrent protection threshold. The first overcurrent threshold and the second overcurrent threshold for starting the overcurrent protection are set according to the look-up table.

Specifically, the drive circuit board includes a memory provided with a look-up table, and the output device obtains a first overcurrent threshold and a second overcurrent threshold according to the look-up table, and sends the obtained first overcurrent threshold and the second overcurrent threshold to the judging circuit; the judging circuit compares the real-time current value and the corresponding overcurrent protection threshold value respectively, and stops the output of the drive current to enable the overcurrent protection when one or more of the real-time current values exceed the corresponding overcurrent protection threshold values.

In this solution, different display panels have different loads, and the larger the load is, the larger the current spike is, thus the overcurrent protection thresholds are different. If the overcurrent protection threshold is lower, the overcurrent protection system of the display panel which needs to input higher drive current will have malfunction; if overcurrent protection threshold is higher, the display panel requiring a lower drive current input may have burned out, but the overcurrent protection has not been enabled. Therefore, in order to ensure that different display panels have the correct overcurrent protection threshold settings, the look-up table is needed to dynamically adjust the panel according to its own load.

The lookup table can effectively realize the different settings of the first overcurrent threshold and the second overcurrent threshold for different display panels, so as to avoid the misjudgment of the detected real-time drive current and ensure the normal operation of the display panel.

As another embodiment of the present application, reference is made to FIGS. 1, 2, 4 and 5. The present application also discloses a display device including the display panel described above.

The technical solution of the present application can be widely used in various display panels, such as Twisted Nematic (TN) display panels, In-Plane Switching (IPS) display panels, Vertical Alignment (VA) display panels and Multi-domain Vertical Alignment (MVA) display panels, and of course, other types of display panels, such as Organic Light-Emitting Diode (OLED) display panels.

The above content is a detailed description of the present application in conjunction with specific alternative embodiments, and it is not to be construed that specific embodiments of the present application are limited to these descriptions. For those of ordinary skill in the art to which this application belongs, a number of simple derivations or substitutions may be made without departing from the spirit of this application, all of which shall be deemed to fall within the scope of this application.

What is claimed is:

1. An overcurrent protection method, comprising steps of:
setting at least two different detection time windows within a level period of a drive current, wherein each time window has its own corresponding overcurrent protection threshold;
detecting at least one real-time current value during each detection time window within the level period; and
comparing the real-time current values with the corresponding overcurrent protection threshold, if one or more of the real-time current values exceed the corresponding overcurrent protection threshold, the overcurrent protection is enabled and the output of the drive current is stopped.

2. The overcurrent protection method according to claim 1, wherein the step of setting at least two different detection time windows within a level period of a drive current, wherein each time window has its own corresponding overcurrent protection threshold comprises: the detection time windows comprise a first detection time window and a second detection time window, and the second detection time window is set after the first detection time window and before level switching; the overcurrent protection thresholds comprise a first overcurrent threshold and a second overcurrent threshold, and the second overcurrent threshold is less than the first overcurrent threshold; the first detection time window corresponds to the first overcurrent threshold, and the second detection time window corresponds to the second overcurrent threshold.

3. The overcurrent protection method according to claim 2, wherein a preset waiting time is set after a level switching time and before the first detection time window; detection of any real-time current value is skipped during the waiting time, and the detection of the at least one real-time current value is started after the first detection time window is reached.

4. The overcurrent protection method according to claim 3, wherein the period after a first level switching and before a next level switching is a level period; the waiting time is within the first 10% of the level period, the first detection time is within a period after the end of the waiting time, and the period accounts for 20% of the total level period; the second detection time is within the last 10% of the level period.

5. The overcurrent protection method according to claim 2, wherein the step of detecting at least one real-time current value during each detection time window within the level period comprises:
continuously sampling the drive current during the first detection time window to obtain a set of first current sampling values;
continuously sampling the drive current during the second detection time window to obtain a set of second current sampling values;
the step of comparing the real-time current values with the corresponding overcurrent protection threshold, if one of the real-time current values exceed the corresponding overcurrent protection threshold, the overcurrent protection is enabled and the output of the drive current is stopped, comprises:
if a first current sampling value in the first detection time window is greater than the first overcurrent threshold value, an overcurrent record is added; when the number of overcurrent records is equal to or greater than a preset number of times the overcurrent protection is enabled and the output of the drive current is stopped;
if a second current sampling value in the second detection time window is greater than the second overcurrent threshold value, the overcurrent protection is enabled and the output of the drive current is stopped.

6. The overcurrent protection method according to claim 2, wherein the step of detecting at least one real-time current value during each detection time window within the level period comprises:
continuously sampling the drive current during the first detection time window to obtain a set of first current sampling values;
sampling the drive current at at least one time point in the second detection time to obtain a set of second current sampling values;
the step of comparing the real-time current values with the corresponding overcurrent protection threshold, if one or more of the real-time current values exceed the corresponding overcurrent protection threshold, the overcurrent protection is enabled and the output of the drive current is stopped, comprises:
if a first current sampling value in the first detection time window is greater than the first overcurrent threshold value, an overcurrent record is added; when the number of overcurrent records is equal to or greater than a preset number of times the overcurrent protection is enabled and the output of the drive current is stopped;
if a second current sampling value in the second detection time window is greater than the second overcurrent threshold value, the overcurrent protection is enabled and the output of the drive current is stopped.

7. The overcurrent protection method according to claim 2, wherein the step of detecting at least one real-time current value during each detection time window within the level period comprises:
continuously sampling the drive current during the first detection time window to obtain a set of first current sampling values;
sampling the drive current at multiple time points in the second detection time to obtain a set of second current sampling values;
the step of comparing the real-time current values with the corresponding overcurrent protection threshold, if one or more of the real-time current values exceed the corresponding overcurrent protection threshold, the overcurrent protection is enabled and the output of the drive current is stopped, comprises:
if a first current sampling value in the first detection time window is greater than the first overcurrent threshold value, an overcurrent record is added; when the number of overcurrent records is equal to or greater than a preset number of times the overcurrent protection is enabled and the output of the drive current is stopped;
if a second current sampling value in the second detection time window is greater than the second overcurrent threshold value, the overcurrent protection is enabled and the output of the drive current is stopped.

8. The overcurrent protection method according to claim 1, wherein the step of setting at least two different detection time windows within a level period of a drive current, wherein each time window has its own corresponding overcurrent protection threshold comprises: the output drive current is a current generated by a clock signal voltage.

9. The overcurrent protection method according to claim 1, wherein the step of detecting at least one real-time current value during each detection time window within the level period comprises: the drive current is an analog signal, and the drive current is analog-to-digital converted during real-time current detection to obtain a current sampling value in a digital signal format.

10. The overcurrent protection method according to claim 1, wherein the step of setting at least two different detection time windows within a level period of a drive current, wherein each time window has its own corresponding overcurrent protection threshold comprises: obtaining the current waveform diagram generated by the drive current according to a drive voltage.

11. The overcurrent protection method according to claim 1, wherein before the step of setting at least two different detection time windows within a level period of a drive current, wherein each time window has its own corresponding overcurrent protection threshold, a look up table is arranged in a drive circuit board, which stores the detection time windows and the corresponding overcurrent protection thresholds, and first overcurrent threshold and a second overcurrent threshold for starting the overcurrent protection are set according to the look-up table.

12. The overcurrent protection method according to claim 1, wherein the step of comparing the real-time current values with the corresponding overcurrent protection threshold, if one or more of the real-time current values exceed the corresponding overcurrent protection threshold, the overcurrent protection is enabled and the output of the drive current is stopped, comprises:
comparing the real-time current values with the corresponding overcurrent protection threshold, if one or more of the real-time current values exceed the corresponding overcurrent protection thresholds controlling a drive circuit board to stop the output of the drive current.

13. The overcurrent protection method according to claim 1, wherein the drive current is a clock signal current of a gate drive circuit.

14. A display panel, comprising:
an overcurrent protection circuit;
and the overcurrent protection circuit comprising:
an output device configured to set at least two different time windows within a level period of a drive current, wherein each time window has its own corresponding overcurrent protection threshold;
a detection circuit configured to detect at least one real-time current value during each detection time window within the level period; and
a judging circuit configured to compare real-time current values with the corresponding overcurrent protection threshold, if one or more of the real-time current values exceed the corresponding overcurrent protection threshold, the overcurrent protection is enabled and the output of the drive current is stopped.

15. The display panel according to claim 14, wherein the display panel comprises a drive circuit board, and when the judging circuit enables the overcurrent protection, the driving circuit board is controlled to stop outputting the drive current.

16. The display panel according to claim 15, wherein the drive circuit board comprises a memory provided with a look-up table, and the output device obtains a first overcurrent threshold and a second overcurrent threshold according to the look-up table and sends the obtained first overcurrent threshold and the second overcurrent threshold to the judging circuit;
and the judging circuit compares the real-time current values with the corresponding overcurrent protection threshold, if one or more of the real-time current values exceed the corresponding overcurrent protection threshold, the output of the drive current is stopped.

17. The display panel according to claim 15, wherein the display panel comprises a timing control circuit, and the detection circuit determines a detection time based on the timing control circuit, and the detection circuit determines a detection time window and detects at least one real-time current value during each detection time window within the level period.

18. The display panel according to claim 16, wherein a preset waiting time is set after a level switching time and before a first detection time; the real-time current value is not detected during the waiting time, and detection of the real-time current value is started after the first detection time is reached.

19. The display panel according to claim 16, wherein the display panel comprises a digital-to-analog conversion circuit connected between the detection circuit and the judging circuit; the drive current output by the detection circuit is an analog signal, and the digital-to-analog conversion circuit performs analog-to-digital conversion on the drive current to obtain a current sampling value in a digital signal format, and sends the current sampling value to the judging circuit.

20. A display device comprising a display panel, wherein the display panel comprises:
an output device configured to set at least two different time windows within a level period of a drive current, wherein each time window has its own corresponding overcurrent protection threshold;
a detection circuit configured to detect at least one real-time current value during each detection time window within the level period; and
a judging circuit configured to compare real-time current values with the corresponding overcurrent protection threshold, if one or more of the real-time current values exceed the corresponding overcurrent protection threshold, the overcurrent protection is enabled and the output of the drive current is stopped.

* * * * *